Oct. 20, 1925.

G. SMITH

PUMP

Filed Aug. 30, 1924

1,558,055

INVENTOR
George Smith
BY
Richey, Slough & Watts
ATTORNEYS.

Patented Oct. 20, 1925.

1,558,055

UNITED STATES PATENT OFFICE.

GEORGE SMITH, OF BALTIMORE, MARYLAND, ASSIGNOR TO ELLICOTT MACHINE CORPORATION, OF BALTIMORE, MARYLAND, A CORPORATION OF DELAWARE.

PUMP.

Application filed August 30, 1924. Serial No. 735,107.

*To all whom it may concern:*

Be it known that I, GEORGE SMITH, a citizen of the United States, residing at Baltimore, in the city of Baltimore and State of Maryland, have invented certain new and useful Improvements in Pumps, of which the following is a specification.

This invention relates to pumps, and more particularly to those employed in dredging and for other purposes in which material is transferred by centrifugal action of a runner.

In pumps now employed for the above purposes, the runner is carried upon one end of a driven shaft and is housed with small clearance within a casing. The shaft is supported by bearings and the bearing adjacent the casing is subjected to substantially the entire load imposed upon the shaft. Due to the small clearance of the runner within the casing, and the load of the shaft being carried by one major bearing, difficulty is experienced in maintaining the shaft in alignment so that the runner will not become displaced within the casing.

One of the objects of my invention is to provide a pump in which the desired clearance between the runner and the casing is maintained substantially constant.

Another object of my invention resides in providing a pump wherein the runner can be readily adjusted within the casing without disturbing the operating mechanism, the casing, or the alignment of the shaft.

Another object of my invention is to provide a major bearing unit for a pump shaft of the class set forth, which can be positioned close to the runner casing, constructed to absorb the unbalanced thrust of the shaft and to position the runner with the desired clearance within the casing.

Still another object of my invention is to mount a runner shaft so that an enclosed and constantly lubricated thrust member will carry any unbalanced thrust.

Another object is to so arrange the parts that the less permanent parts which are the more subject to wear and consequently require more frequent replacement will not be required to be subjected to expensive machining to secure proper alignment of parts when the machine is assembled.

Another object of the invention is to so build the machine of separate parts so related that the parts more subject to wear may be easily and less expensively replaced and aligned with less difficulty with the remaining parts.

These and other objects, and the invention itself, will be more clearly understood from the following specification.

Figure 2:
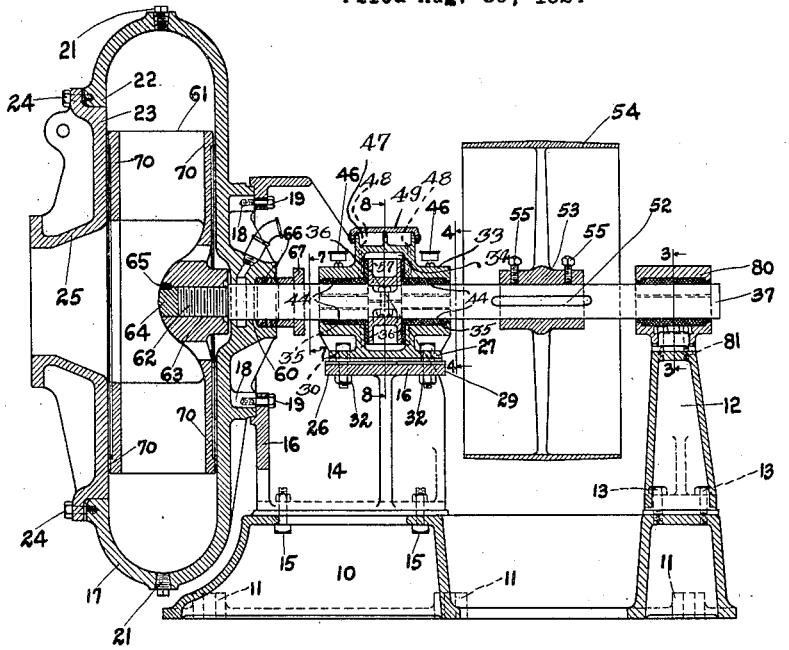
Figure 1:
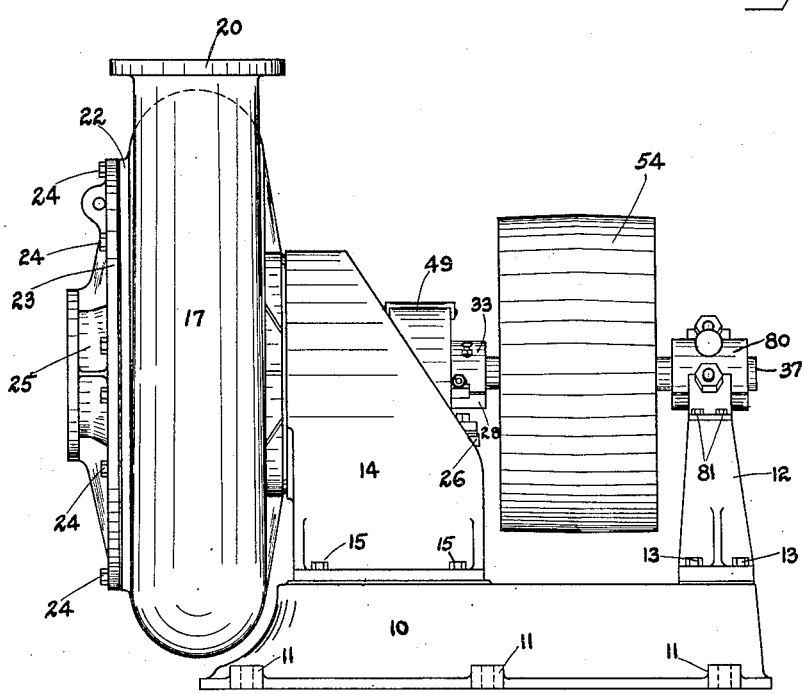

In the accompanying drawings, Figure 1 is a side elevation of a pump embodying my invention; Figure 2 is a medial longitudinal sectional view of the same.

Referring to the drawings by characters of reference, 10 represents the bedplate for the pump which may be secured in desired position by suitable fastening means passing through the bosses 11. A pedestal 12 is secured upon one end of the bedplate by bolts 13, and a curved pedestal bracket 14 is secured upon the other end of the bedplate by bolts 15. The pedestal bracket is provided with an apertured flange 16 which extends intermediate the inner walls of the sides thereof for supporting the runner casing 17. The closed end of the runner casing is provided with a plurality of bosses 18 which bear against the flange 16 of the pedestal bracket and bolts 19 extend through apertures in the bracket flange and are screwed into the bosses to retain the casing rigidly with the pedestal.

The casing is provided with an outlet elbow 20 which extends in a plane transversely to the axis thereof, and plugs 21 are screwed into openings in the casing for drainage purposes. The casing is provided with an open face 22 and a cover plate 23 extends over the opening and is secured to the exterior of the open casing face by bolts 24. The cover plate is provided with an annular axially projecting flanged neck 25 which provides the inlet for the casing. It will be understood that pipes are attached to the inlet flange and the outlet elbow providing a continuous conduit, the inlet end of which is placed adjacent the material to be transferred and the outlet end extending to the desired place of deposit for the material pumped therethrough.

Sometimes it is desired that the outlet pipe extend in a horizontal plane, and at other times that it extend in a vertical plane. By removing the bolts 19, the casing can be shifted annularly so that the outlet elbow will extend in the desired plane after which adjustment the bolts are again secured through the apertures in the pedestal bracket flange and the bosses 18 which are spaced to align therewith in either position of the elbow. In this manner one casing will suffice to direct the material being pumped in a plurality of directions.

A major bearing supporting plate 26 extends horizontally between the side walls of the pedestal bracket adjacent the flange 16, and is preferably formed integrally with the sides. The upper surface of the sides of this plate are finished to receive the spaced base flanges 27 of the lower bearing section 28. The plate sides are provided with apertures 29, and the flanges 27 are provided with elongated slots 30, bolts 31 extending through the slot 30 and the apertures 29 to adjustably secure the bearing section upon the plate when nuts 32 are screwed up upon the bolts. The upper side faces of the lower bearing section are preferably formed at a 45 degree angle and support similarly formed lower faces of the upper bearing section 33. The bearing sections are formed with stepped faces, and a semi-circular bore extends longitudinally intermediate the faces. The central portion of the bore is of larger diameter, providing an annular recess 34 intermediate the ends of the bearing sections. A Babbitt liner 35 is suitably secured within the bore of each section on each side of the recess, such liners terminating in flanges 36 which are secured in a suitable manner to the side walls in the bearing sections formed by the recess 34. The bearing formed by these sections forms the major support for the runner shaft 37 which is rotatably carried thereby. Fibre liners 38 are placed between the outer babbitted meeting faces of the bearing sections, and felt washers 39 are placed between the inner babbitted meeting faces of the sections adjacent the shaft. The bearing sections are secured together by bolts 40 which extend through aligned bosses 41 formed on the exterior wall of the sections, and by dowel pins 42 which extend through aligned bosses 43 formed on the exterior wall of the sections.

The interior face of the Babbitt liners are provided with oil grooves 44, and passages 45 extend through the upper bearing section and the Babbitt liners through which lubricant is forced by the cups 46 secured in the outer ends thereof. An open receptacle 47 is formed centrally of the upper bearing section and passages 48 extend therefrom through the flanged portions of the upper Babbitt liners, to lubricate the inner surfaces thereof and to feed lubricant to the oil grooves 44. A removable cover plate 49 is provided to close the receptacle 47.

The shaft 37, adjacent the end bearing, is provided with a longitudinally extending key 52, which engages the hub 53 of a pulley 54. Screws 55 extend through the hub of the pulley and engage the shaft to secure the pulley lengthwise upon the shaft. It is understood that a belt extends around the pulley and a suitable source of power to rotate the runner shaft. It will also be understood that the source of power can be operatively connected with the runner shaft in various other conventional manners.

A two part bearing 80 is secured by bolts 81 to the upper end of the pedestal 12, and is arranged in alignment with the major bearing. The shaft extends through this bearing but substantially all of the load is taken by the major bearing.

The runner shaft extending through the major bearing, is of a reduced diameter intermediate the flanges of the Babbitt liners therein. A two part annular thrust member 57 is secured around the reduced portion of the shaft by bolts 58 which extend through shoulders 59 formed with the sections. The thrust member rotates with the shaft, is of a diameter to fit within the central recess in the major bearing, and is of a width such that the ends thereof bear against the faces of the flanged ends of the Babbitt liners. It will be seen that any unbalanced thrust of the runner shaft will thus be carried by the thrust member.

The inner wall of the runner casing is provided with a central aperture 60 through which the runner shaft projects. The shaft projects into the runner casing and a runner 61 is secured to the end thereof. The end 62 of the shaft is of reduced diameter and is threaded in the direction in which the shaft rotates. The runner is provided with an axially extending aperture 63 and the wall therearound is threaded. A threaded plug 64 is screwed into the outer end of the aperture 63 to determine the distance the runner will screw upon the shaft and a dowel pin 65 is driven intermediate the plug and the runner to prevent displacement of the plug. As the shaft rotates in only one direction and being threaded in that direction, it will screw into the runner until it abuts the plug, where it will remain constantly, maintaining the runner in the set position without the aid of any securing means.

The bearing sleeve of the runner is of sufficient diameter at its end to receive packing rings 66, and a gland member 67 is provided for maintaining the rings in leak proof relation intermediate the sleeve and the shaft extending therethrough.

Studs 68 extend through the gland member and are screwed into the sleeve, and nuts 69 are threaded upon the outer ends of the studs and bear against the gland member to clamp the rings in position.

The runner is of a conventional form in which annular ends 70 are provided with radially curved blades extending therebetween. The outer side is provided with a large central opening through which material passes to the blades, the blades extending in a plane exteriorly of this opening. The rotation of the shaft will cause material to pass through the conduit, due to the centrifugal action of the runner.

It will be seen that the major bearing is elongated and located close to the runner, so that sagging of the shaft is overcome, thereby eliminating wear in the stuffing box and the bearing linings. It will also be seen that by removing the cover plate of the casing the runner can be removed without disturbing the shaft and its bearings, and without disturbing the runner casing. It will also be seen that the runner casing and the shaft can be aligned prior to the securement of the casing, and this is a decided advantage as this alignment of the casing and shaft is apt to occur when alignment is made after bolting the casing in position. The enclosed thrust collar running in oil, also adds to maintaining the shaft in alignment, as it carries any unbalanced thrust of the shaft.

It will be noted that the bracket 14 in my improved construction entirely supports the pump casing 17 rather than the reverse arrangement which is common, and the other parts are carried thereby in such a way that the entire mechanism can be easily and quickly assembled in process of construction and disassembled and reassembled in part or in toto when repairs have to be made which is often the case when the mechanism is put into service, since the casing 17, the runner 70 and the head 23 are in service subjected to wear and are worn away by the action of sand and the like which may be drawn through the pump. When so replacing the parts which are the more subjected to wear, my novel construction permits the removal of the case 17, the runner 70 and head 23 for replacement without breaking down or disassembling the integral machine comprising the working head or mechanism which includes the base or bed plate 10, the bearings 28—33 and 80, the brackets and the shaft; also another advantage accruing from my improved construction resides in the fact that the wearing parts above named are so designed that it is only necessary to machine them in a simple and easy way which is not costly, and which may be done with ordinary machines by less skilled mechanics than is the case with the more permanent parts of the mechanism such as the brackets 14 and 12, the bearings 28—33 and 80 and the bed plate 10.

These parts being permanent and not subject to replacement on account of wear are of such a nature that more expensive and careful machining is justifiable, but these results cannot be obtained in a mechanism wherein the casing is supported by the bed plate as is a common practice.

The runner has very little clearance within the casing and misalignment of the shaft will cause serious damage thereto as well as to the major bearing. By adjusting the longitudinal position of the major bearing upon the supporting pedestal the position of the runner within the casing can be regulated, as the shaft moves axially with the bearing. The casing and the bearing being supported upon a single pedestal, also eliminates misalignment due to relative movement upon the base.

Various changes can be made in the details described herein without departing from the spirit of my invention and the scope of the appended claims.

What I claim is:

1. In a pump, a pedestal bracket, a thrust and radial bearing adjustably carried by said bracket, an annular runner casing, also carried by said bracket having an axially located inlet port and a tangentially extending outlet port, releasable means for adjustably securing said casing to said bracket with its outlet port extended in any one of a plurality of radial directions, said casing being rigidly spaced from the bearing by an intermediate portion of the bracket, a driven shaft entirely supported by said bearing at its end closely adjacent the pump casing and projecting axially into said casing, a thrust element secured to the shaft having a pair of end faces engaging said thrust bearing, and a runner secured to said shaft within said casing.

2. In a pump, a runner casing, a supporting base, a bearing disposed exteriorly of the casing, a pedestal rigidly supporting the casing and the bearing on said base and comprising a rigid bracing portion extending between the casing and the bearing, a driven shaft having an end entirely supported closely adjacent the bearing in said bearing and having such end extending freely into said casing, a runner secured to said shaft end and carried entirely thereby within said casing, said runner being disposed closely to the walls of the casing and a thrust collar secured to said shaft within said bearing adapted to restrain thrust movements thereof in either direction axial thereof, an aligning bearing for the other end of the shaft carried on the base, and a wheel intermediate said bearings to rotate said shaft.

In testimony whereof I hereunto affix my signature this 29th day of August, 1924.

GEORGE SMITH.